US010447122B2

(12) United States Patent
Desenclos et al.

(10) Patent No.: US 10,447,122 B2
(45) Date of Patent: Oct. 15, 2019

(54) ROTATING ELECTRIC MACHINE PROVIDED WITH A WINDING HEAD

(71) Applicant: VALEO EQUIPEMENTS ELECTRIQUES MOTEUR, Creteil (FR)

(72) Inventors: Stéphane Desenclos, Tubersent (FR); Eric Delcroix, Etaples sur Mer (FR); Mostafa Kadiri, Etaples sur Mer (FR); Ludovic Doffe, Etaples sur Mer (FR); Benjamin Pouchelle, Etaples (FR); Patrice Azoulay, Etaples sur Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 210 days.

(21) Appl. No.: 15/600,053

(22) Filed: May 19, 2017

(65) Prior Publication Data

US 2017/0346357 A1 Nov. 30, 2017

(30) Foreign Application Priority Data

May 25, 2016 (FR) ...................................... 16 54707

(51) Int. Cl.
*H02K 15/00* (2006.01)
*H02K 3/24* (2006.01)
(Continued)

(52) U.S. Cl.
CPC .......... *H02K 15/0037* (2013.01); *H02K 3/24* (2013.01); *H02K 3/28* (2013.01); *H02K 3/50* (2013.01);
(Continued)

(58) Field of Classification Search
CPC .. H02K 3/24; H02K 15/0037; H02K 15/0025; H02K 9/06; H02K 9/005;
(Continued)

(56) References Cited

U.S. PATENT DOCUMENTS 1,479,636 A * 1/1924 Wiard ...................... H02K 9/06
310/166
2,074,067 A * 3/1937 Darnell .................... H02K 9/06
310/52

(Continued)

FOREIGN PATENT DOCUMENTS

EP 0515259 A1 11/1992
EP 0671801 A2 9/1995
(Continued)

*Primary Examiner* — Mohamad A Musleh
(74) *Attorney, Agent, or Firm* — Berenato & White, LLC (57) ABSTRACT

Rotating electric machine provided with an axis X. The machine comprises a front part and a rear part. The machine comprises a rotor of axis X comprising two axial end surfaces, each provided with fan blades. The axial surfaces located on the side of the front part and on the side of the rear part. A stator comprises a stator body having slots. The stator comprises a winding installed in the slots and forming a front winding head and a rear winding head. The rotor and the stator are placed in a casing. The front winding head completely masks the blades of the axial surface located on the front side of the machine, along a direction perpendicular to axis X.

20 Claims, 8 Drawing Sheets

(51) Int. Cl.
 *H02K 3/28* (2006.01)
 *H02K 3/50* (2006.01)
 *H02K 9/00* (2006.01)
 *H02K 19/00* (2006.01)
 *H02K 9/06* (2006.01)

(52) U.S. Cl.
 CPC .............. *H02K 9/005* (2013.01); *H02K 9/06* (2013.01); *H02K 15/0025* (2013.01); *H02K 19/00* (2013.01); *H02K 2213/03* (2013.01)

(58) Field of Classification Search
 CPC ............ H02K 3/50; H02K 3/28; H02K 19/00; H02K 2213/03
 See application file for complete search history.

(56) References Cited

U.S. PATENT DOCUMENTS

| | | | | |
|---|---|---|---|---|
| 2,193,408 A | * | 3/1940 | Knight | H02K 9/06 310/216.049 |
| 2,286,750 A | * | 6/1942 | McMahan | H02K 9/06 310/52 |
| 2,436,930 A | * | 3/1948 | Arthur | H02K 7/116 310/52 |
| 2,545,855 A | * | 3/1951 | Luenberger | H02K 9/06 310/58 |
| 2,571,907 A | * | 10/1951 | Ludwig | H02K 5/10 307/155 |
| 2,608,677 A | * | 8/1952 | Wightman | H02K 9/06 200/80 R |
| 2,716,195 A | * | 8/1955 | Anderson | H02K 9/06 310/57 |
| 2,836,741 A | * | 5/1958 | Werner | H02K 9/06 310/113 |
| 3,020,427 A | * | 2/1962 | Wheeler | H02K 9/06 310/105 |
| 3,250,926 A | * | 5/1966 | O'Reilly | H02K 9/06 310/59 |
| 3,761,748 A | * | 9/1973 | Baumann | H02K 9/06 310/58 |
| 4,859,889 A | * | 8/1989 | Andrews | H02K 5/15 310/89 |
| 5,250,864 A | | 10/1993 | Kusumoto et al. | |
| 5,270,605 A | | 12/1993 | Lefrancois et al. | |
| 5,757,094 A | * | 5/1998 | van Duyn | H02K 1/32 310/157 |
| 6,002,219 A | | 12/1999 | Permuy | |
| 6,897,597 B1 | | 5/2005 | Armiroli et al. | |
| 2002/0175589 A1 | | 11/2002 | Takizawa et al. | |
| 2003/0011257 A1 | * | 1/2003 | Akemakou | H02K 11/048 310/91 |
| 2015/0194861 A1 | | 7/2015 | Fakes et al. | |

FOREIGN PATENT DOCUMENTS

| | | |
|---|---|---|
| EP | 0917278 | 5/1999 |
| EP | 0998011 A1 | 5/2000 |
| EP | 2873139 B1 | 10/2016 |
| FR | 2745445 A1 | 8/1997 |
| FR | 2784248 A1 | 4/2000 |
| JP | 2000358348 A | 12/2000 |

\* cited by examiner

FIG. 1

Prior Art

FIG. 2

Prior Art

ROTATING ELECTRIC MACHINE PROVIDED WITH A WINDING HEAD

CROSS-REFERENCE TO RELATED APPLICATIONS AND CLAIM TO PRIORITY

This application is related to Patent Application No. 1654707 filed May 25, 2016 in France, the disclosure of which is incorporated herein by reference and to which priority is claimed.

FIELD OF THE INVENTION

The present invention relates to a rotating electric machine provided with a winding head having an improved form, the machine intended to be installed in an automotive vehicle to function with a combustion engine or to ensure the propulsion of the automotive vehicle. The invention also relates to a method for constructing such a rotating electric machine.

BACKGROUND OF THE INVENTION

In the known way, the rotating electric machine comprises two coaxial parts, i.e. a rotor and a stator surrounding the body of the rotor.

Figure 1:
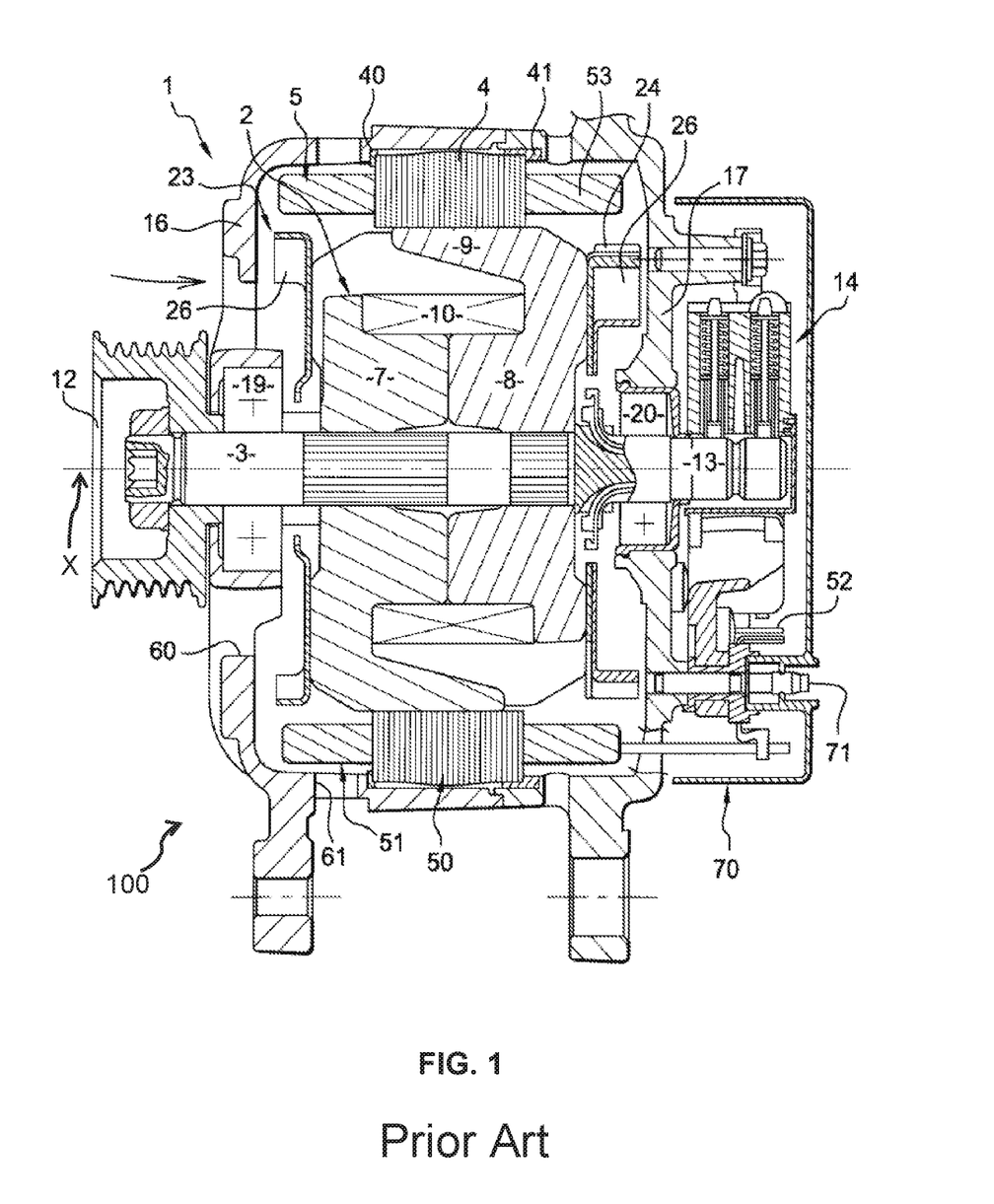
FIG. 1, already described, illustrates a cross-section of a rotating electric machine according to the prior art.

With reference to FIG. 1, an example of such a rotating electric machine referenced 100 is illustrated, in the case of an alternator with internal ventilation of the polyphase type for combustion engine automotive vehicles functioning in alternator mode. Naturally the alternator can also be reversible and consist of an alternator-starter also functioning in electric motor mode in particular to start the combustion engine of the vehicle as described in patent FR A 2 745 445 to ensure the propulsion of the automotive vehicle.

When machine 100 functions in alternator mode it converts mechanical energy to electrical energy like any alternator. When the machine functions in electric motor mode, particularly in starter mode to start the combustion engine of the vehicle, it converts electrical energy to mechanical energy.

This machine 100 primarily comprises a casing 1 and, inside the latter, a rotor 2 integral with a central shaft 3, known as rotor shaft, and a stator 50 of annular form, which surrounds rotor 2 with the presence of an air gap and which comprises a body 4 in the shape of a stack of steel sheets equipped with slots, for example of the half-closed type, for assembling a stator winding 5 forming on either side of body 4 of stator 50, at each axial end of the latter, a front winding head 51 and a rear winding head 53 which protrude axially.

This winding 5 for example comprises a set of three-phase coils in star or delta-connection, the outputs of which are connected to a rectifying bridge, partially visible in 52, comprising rectifying elements such as diodes or transistors of the MOSFET type, in particular if the machine consists of an alternator-starter.

Coils of winding 5 are obtained using a continuous, electrically conductive wire, covered with an electrically insulating layer, such as enamel, and assembled in the slots concerned of body 4 of stator 50 via slot insulators (not visible).

According to another alternative embodiment, winding 5 comprises two sets of three-phase coils to form a composite coil stator device, the coils being shifted by thirty electric degrees as described for example in patents US-A1-2002/0175589 and FR-A-2 784 248. In this case it is proposed that two rectifying bridges and all combinations of three-phase coils with star- and/or delta-connection are possible. Alternatively the winding of the stator is of the pentaphase type.

Generally the alternator is of the polyphase type and the bridge rectifiers in particular make it possible to rectify AC generated in the coils of stator 50 into DC, in particular to charge the battery of the automotive vehicle and to supply the loads and the electric consumers of the on-board power system of the automotive vehicle.

Rotor 2 of annular form is constructed in the example illustrated in the shape of a claw rotor, as described for example in patent US-A1-2002/0175589, comprising two polar wheels 7, 8 axially juxtaposed here and each exhibiting a transverse flange of annular form provided on its outer periphery of claws 9.

Each claw 9 comprises a root section of transversal orientation in the plane of the flange concerned. This root section is prolonged on its outer periphery by a tooth of broadly axial orientation with the presence of a chamfer between the tooth and the root section.

An annular air gap exists between the outer peripheral face of the teeth of claws 9 and the inner periphery of body 4 of stator 50.

The teeth overall are of trapezoidal or triangular form. The teeth of a polar wheel 7, 8 are directed axially towards the flange of the other polar wheel 8, 7, the tooth of a wheel 7, 8 penetrating in the space existing between two adjacent teeth of the other wheel 7, 8, so that the teeth of wheels 7, 8 overlap. For more precise details reference shall be made to patent EP 0515259.

A field winding 10 is axially arranged between the flanges of wheels 7, 8. It is supported by part of rotor 2 in the form of a cylindrical annular core coaxial to shaft 3. The core of FIG. 1 consists of two axially distinct sections, each of which is based on material associated with a polar wheel 7, 8. According to an alternative embodiment, not illustrated, the core consists of a single part and is distinct from polar wheels 7, 8 which are axially arranged on either side of the core.

Winding 10 is thus arranged in the space delineated radially by claws 9 of wheels 7, 8 and the central core.

Wheels 7, 8 and the core preferably consist of ferromagnetic material and are passed through in a coaxial way by the shaft of rotor 3, also made from ferromagnetic material. These wheels 7, 8 are integral with shaft 3. For this purpose, each wheel 7, 8 comprises a central boring which axially passes through the flange and prolongs the boring of the part of the core concerned. Shaft 3 exhibits knurled portions (not referenced) and is fixed by force in said borings of the core and wheels 7, 8, so that it cuts furrows by way of its knurled portions. Shaft 3 is thus integral and axially fixed with the wheels, a spacer, not referenced, being interposed between wheel 7 and a bearing 19 described below.

The axis of shaft 3 constitutes axis X of the machine. The wire of winding 10 is wound on a bracket made of electrically insulating material (not illustrated) mounted, preferably by force, on the outer periphery of the core.

When the field winding 10 is activated, i.e. electrically energized, wheels 7, 8 and the core, are magnetized and rotor 2 becomes an inductive rotor with magnetic poles being formed around claws 9 of wheels 7, 8.

This inductive rotor 2 creates an alternating current induced in stator 50 when shaft 3 rotates.

Shaft 3 of rotor 2 at its front end supports a movement transmission system 12, here a pulley 12 pertaining to a movement transmission device by means of at least one belt (not illustrated) between the alternator and the combustion engine of the automotive vehicle. This shaft at its rear end supports slip rings 13 connected by wired connections (not illustrated) on the ends of field winding 10 of rotor 2.

Alternatively pulley 12 is replaced by a gearbox and the transmission device has a chain and/or gears.

Brushes belong to a brush holder illustrated in a general way by reference symbol 14 and are designed to rub on slip rings 13, in order to supply winding 10 with electric current. Brush holder 14 is connected to a voltage regulator (not illustrated).

Here casing 1 in which rotor 2 and stator 50 are placed is in two parts, namely a front flange 16 adjacent to pulley 12 and a rear flange 17 supporting rectifying brush holders 14 and generally bridge(s) and the voltage regulator. Flanges 16, 17 of annular form, for example based on aluminium, are of hollow form and each centrally support a ball-bearing 19 and 20 respectively for rotatably mounting shaft 3 of rotor 2. The flanges are assembled together using ties or screws as visible for example on FIG. 1 of patent EP 0515 259 mentioned above. In other words, casing 1 of machine 100 comprises front flange 16, also known as front bearing, and rear flange 17, also known as rear bearing.

On FIG. 1, an elastic system in the shape of a stack of metal sheets is provided on the outer periphery of body 4 of the stator to filter vibrations, with a flat joint 40 in front and plugs 41 at the rear, flexible and heat-conductive resin being inserted between the front flange and the stator body to evacuate heat.

Alternatively no joints are proposed. In all cases the stator is supported in a fixed way by casing 1, while rotor 2 is centrally mounted for rotation by casing 1 via bearings 19, 20.

Alternatively the casing is in three parts, flanges 16, 17 being arranged on either side of a central part supporting the stator body. The flanges are assembled with the intermediate part for example by screwing.

The alternator also comprises means for its cooling. For this purpose, on FIG. 1, flanges 16, 17 are open to allow cooling of the alternator by air circulation and rotor 2 supports a fan intended to ensure this air circulation, at least on one of its axial ends. Here a first fan 23 is provided on the front face of rotor 2 and a second fan 24 on the rear face of rotor 12. Each fan 23, 24 is of annular form and equipped with a plurality of blades 26 and is fixed on the outer radial faces of the flanges of wheels 7, 8.

The fans are for example metal and obtained with their blades 26 by cutting and folding. Fans 23, 24 are for example of the centrifugal or helical-centrifugal type.

With reference to FIG. 1, the air is aspired through openings 60 of the front flange surrounding pulley 12 in front of the flange, then is mainly ejected in a centrifugal way by blades 26 and passes in the space between front winding head 51 and front flange 16 to cool the front winding head and finally to exit through openings 61 on the outer radial periphery of the front flange. Rear flange 17 also has a plurality of air intake and outlet openings.

On FIG. 1, brush holder 14 and the voltage regulator, integral with flange 17, are capped by a cover 70, integral with rear flange 17, being fixed here on the latter, in a way known, by click-and-ratchet work on pins 71 integral with the rear flange. This cover 70 also has air intake openings, not visible on FIG. 1.

Figure 2:
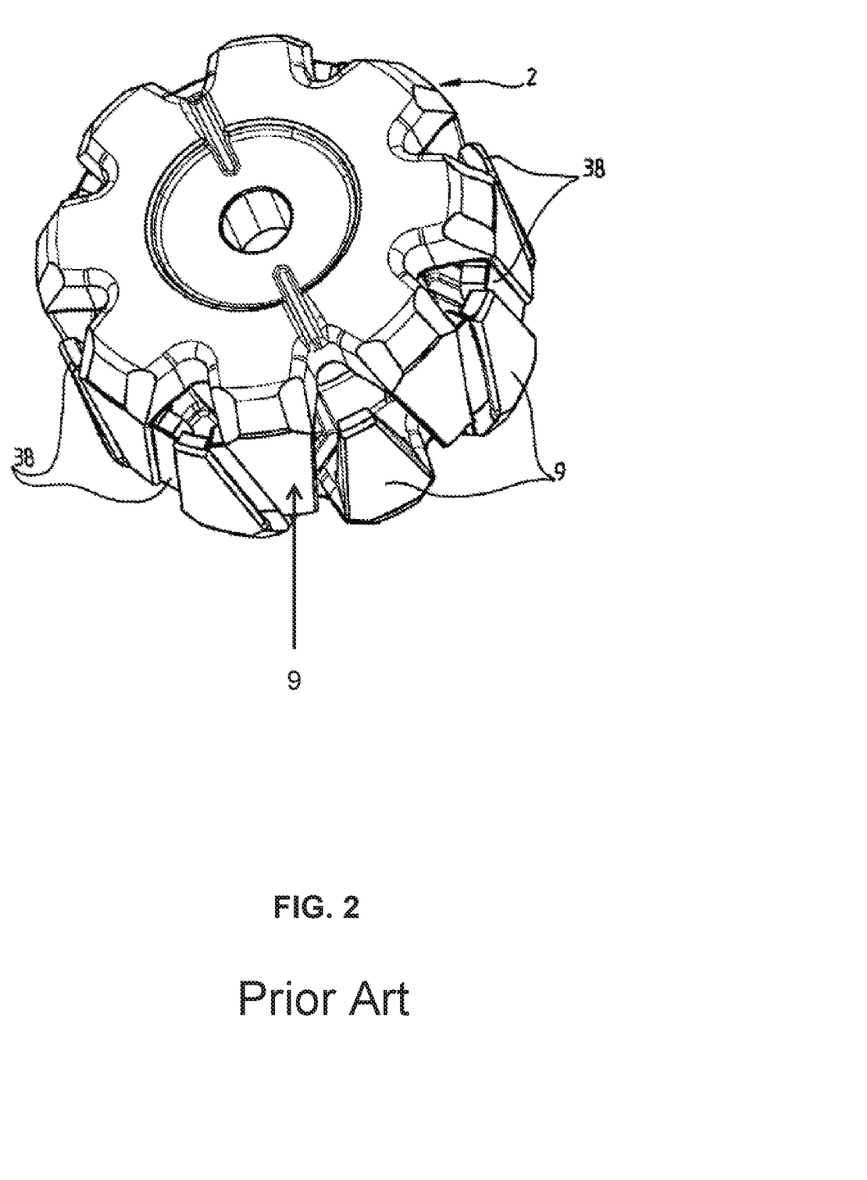
FIG. 2, already described, is a perspective view of a rotor according to the prior art.

FIG. 2 illustrates a claw rotor according to the prior art. It comprises a pair of overlapping wheels 7 and 8. Wheels 7 and 8 comprise claws 9. In an optional way rotor 2 comprises inter polar magnets 38. Rotor 2 shown on FIG. 2 comprises 8 pairs of poles.

Although this machine is satisfactory, it may be desirable to improve the latter particularly by attenuating the noise which it generates when in operation, driven by the combustion engine or in the case of an alternator-starter when it functions in motor mode.

SUMMARY OF THE INVENTION

The invention is aimed at responding to this desire while overcoming at least one of these afore-mentioned disadvantages.

According to the invention, a rotating electric machine with an axis X is proposed, said machine comprising a front part and a rear part relative to axis X, said machine comprising:

a rotor of axis X which comprises two axial end surfaces which are provided with fan blades allowing a flow of cooling air, the two axial surfaces being located on the side of the front part and on the side of the rear part of the machine respectively;

a stator which comprises a stator body having slots and surrounding said rotor, said stator comprising a winding installed in said slots forming a front winding head which extends from an axial end of the stator body towards the front part of the machine and a rear winding head which extends from another axial end of the stator body towards the rear part of the machine;

a casing in which the rotor and the stator are placed.

According to a general characteristic, along a direction perpendicular to axis X, the front winding head completely masks the blades of the axial surface located on the front side of the machine. Thus the front winding head acts as sound screen with respect to the noises generated by the blades of the axial surface located on the front side of the machine. Therefore it is possible that these noises are attenuated by the winding head. It is a solution which enables the noise to be reduced without compromising the performance of the machine and in particular its cooling and the current which it outputs when functioning in alternator mode. For example, it may be proposed that the blades of the axial surface located on the front side of the machine allow centrifugal ejection of the cooling air.

According to other characteristics taken separately or in combination:

the level along axis X of the front winding head is higher or equal to the level along axis X of the masked blades. Thus the height of the front winding head is adapted so that it can act as screen.

the winding heads comprise wires provided with two axial portions extending along axis X and a transverse portion extending in a plane perpendicular to axis X, the front winding head forming spacings located between the transverse portions and the stator body and said spacings allow passage of the cooling air. Thus the flow surface can be increased and the velocity of the flow can be reduced with a constant rate.

the winding installed in the slots is offset relative to the stator body, so that the front winding head completely masks the blades of the axial surface located on the front side of the machine, while the blades of the axial surface located on the rear side of the machine axially overlap the rear winding head. Thus increasing the size of the winding is pointless.

This avoids having to consume additional copper and increase the resistance of the stator winding.

the front winding head has a form allowing a reduced flow velocity of the cooling air for a given air speed. For example, the winding head comprises a head having a conical form. A compromise between conservation of the sound screen function and increase in the flow surface is therefore ensured.

the machine comprises a flow window of cooling air which is defined between the casing and front winding head, the thickness of the casing being reduced to the level of this window to allow an increase of said window. Thus an increase in the surface of the flow of the cooling air and therefore a reduced flow velocity is possible.

the R1 ratio defined as the division of the difference between the height of the front winding head and the height of the rear winding head by the height of the stator body ranges between 1 and 5%. Thus an optimum ratio is obtained allowing the best performances to be achieved from the point of view of noise abatement without attenuating the cooling of the machine.

the R2 ratio of the external diameter to the internal diameter ranges between 1.30 and 1.32.

the rotor comprises a number of pairs of poles different from that of the number of blades of each of the two axial end surfaces. Thus the noise can be distributed over several harmonic orders, which reduces the noise generated overall. For example, the number of pairs of pole is 8 while the number of blades on the front end axial surface is 11 and the number of blades on the rear end axial surface is 13.

The invention is also aimed at a method for constructing a rotating electric machine provided with an axis X, said machine comprising a front part and a rear part relative to axis X and moreover comprising:

a rotor of axis X which comprises two axial end surfaces which are provided with fan blades allowing a flow of cooling air, the two axial surfaces being located on the side of the front part and on the side of the rear part of the machine respectively;

a stator which comprises a stator body having slots and surrounding said rotor, the method comprising a winding stage of copper wires in said slots so as to form a front winding head which extends from an axial end of the stator body towards the front part of the machine and a rear winding head which extends from another axial end of the stator body towards the rear part of the machine.

According to a general characteristic, after the winding stage the method moreover comprises an offsetting stage along an axial direction of the winding relative to the stator body, so that the front axial winding head completely masks the blades of the axial surface located on the front side of the machine, along a direction perpendicular to axis X. Thus a method which is easy to implement and which can be inserted in the present stages of construction is proposed.

BRIEF DESCRIPTION OF THE DRAWINGS

The invention will be better understood on reading the following description and on examining the accompanying figures. These figures are given on a purely illustrative, but by no means restrictive, basis of the invention.

Identical, similar or analogous components keep the same reference symbol from one figure to the next.

DETAILED DESCRIPTION OF THE PREFERRED EMBODIMENT(S)

Figure 3:
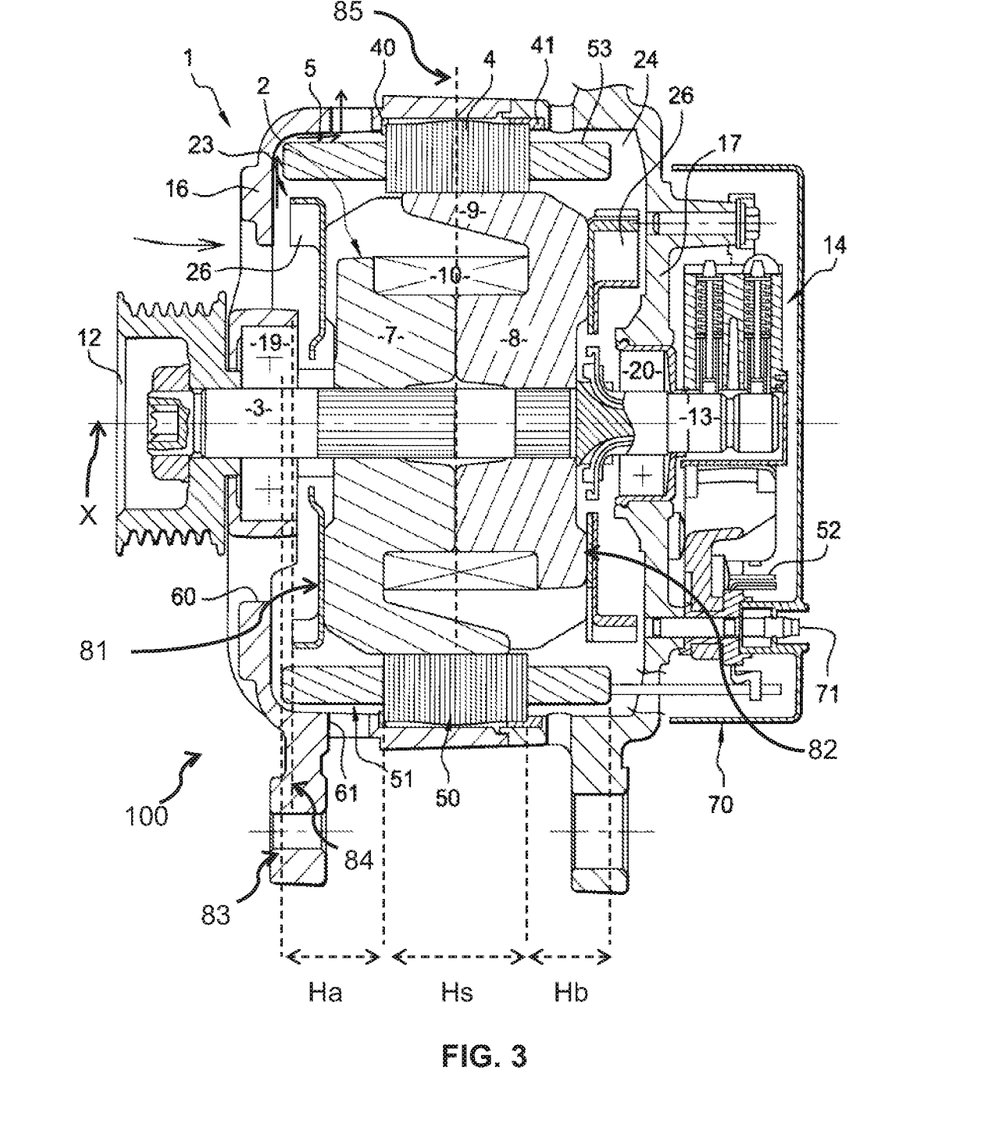
FIG. 3 illustrates a cross-section of a rotating electric machine in the form of an alternator according to a first embodiment of the invention.

FIG. 3 illustrates a rotating electric machine 100 provided with an axis X according to the invention.

This machine is distinguished from the machine illustrated on FIG. 1 particularly in that winding head 51 completely masks blades 26 of fan 23.

Machine 100 comprises a first part formed in particular by front flange 16 and a second part formed in particular by rear flange 17. These two parts are called front and rear according to their position relative to axis X. More precisely the front part is located on the side of pulley 12 while the rear part is located on the side of electric cover 70.

Rotor 2 is of axis X and comprises two axial end surfaces 81 and 82 which are provided with blades 26 of fans 23, 24 allowing a flow of cooling air for example by centrifugal ejection. Two surfaces 81 and 82 are located on the side of the front part and on the side of the rear part of the machine respectively. The two axial surfaces 81 and 82 are each located in one of the two planes perpendicular to axis X which delineate rotor 2.

Stator 50 comprises a winding 5 installed in the slots forming a front winding head 51 which extends from an axial end of the stator body 4 towards the front part of the machine and a rear winding head 53 which extends from another axial end of the stator body towards the rear part of machine 1.

In electric machine 100 illustrated on FIG. 3, front winding head 51 completely masks blades 26 of axial surface 81 located on the front side of the machine, along a direction perpendicular to axis X.

For this purpose, the level along axis X of front winding head 51 is higher or equal to the level along axis X of masked blades 26. A plane 85 passing between two wheels 7 and 8 of rotor 2 is defined by a dotted line on FIG. 3.

A plane 83 comprising the axial end of front winding head 51 is defined, said axial end corresponding to the point of winding head 51 furthest from stator body 4 along axis X. This plane is illustrated by a dotted line on FIG. 3.

A plane 84 comprising the axial end of blades 26 is defined, said axial end corresponding to the point of blades 26 furthest from wheel 7 along axis X. This plane is illustrated by a dotted line on FIG. 3.

Thus level of winding head 51 is understood to mean the distance between plane 83 and plane 85 and similarly, level of blades 26 of axial surface 81 is understood to mean the distance between plane 84 and plane 85. For example, it may be proposed that the difference between the level of winding head 51 and the level of blades 26 of axial surface 81 ranges between 0 and 1 mm.

Stator body 4 for example is formed by a stack of steel sheets having a height Hs defined as the distance between two planes perpendicular to axis X delineating the stator body.

Front 51 and rear 53 winding heads each exhibit a height defined as the distance between the plane perpendicular to axis X comprising the point of the winding head furthest from the stator body and one of the two planes perpendicular to axis X delineating the stator body.

According to an embodiment of the invention, height Ha of front winding head 51 is 23 mm, height Hb of rear winding head 53 is 22 mm and height Hs of the stack of steel sheets forming body 4 of stator 50 is 35 mm.

Thus, when defining a R1 ratio, allowing the difference between the front winding head and the rear winding head to be related to the height of winding head body 4, R1=23−22/35=0.0285 is obtained.

According to an embodiment of the invention, it may be proposed that the height of the front winding head is adjusted relative to the rear winding head, so that the R1 ratio ranges between 1 and 5%, for example between 2 and 4%.

This difference in level between front winding head 51 and rear winding head 53 can be obtained by offsetting winding 5 relative to the stator body.

According to an embodiment illustrated on FIG. 3, winding 5 installed in the slots is offset relative to the stator body, so that front winding head 51 completely masks blades 26 of axial surface 81 located on the front side of the machine, while blades 26 of axial surface located 82 on the rear side of the machine axially overlap rear winding head 53.

By masking blades 26 of axial surface 81 located on the front side of the machine, the noises generated by the air speed centrifuged by these blades 26 are greatly reduced.

Indeed, the front winding head will thus act as screen for the noises of the centrifugal air flows, these air flows allowing the machine to be cooled by circulation of an air flow on front winding head 51 in particular.

For the purpose of illustration, FIG. 3 shows the flow of cooling air in the front part of the machine. This flow comprises an aspiration of the cooling air coaxially to the axis X through openings 60 provided only in the front flange 16, its centrifugal ejection by blades 26, then its passage in the space between the front winding head 51 and the front flange 16 to cool the front winding head, and finally its exit through openings 61 provided in the front part of the electric machine (100).

Rear winding head 53 is less critical for the noise, because the flows are more erratic in particular due to the presence of the electronic part being cooled and axial flows which make the centrifugal flows less dominant. Thus, even if rear winding head 53 masks blades 26 of axial surface 82 located on the rear side of the machine to a lesser extent because of the shift towards the front of winding 5, a reduction in the total noise is obtained.

Among the noises generated by a rotating rotor, certain harmonics related to the geometry of the rotor are dominant. In particular, the number of blades of the rotor on axial surface 81 located on the front side, the number of blades of the rotor on axial surface 82 located on the rear side and the number of pairs of poles can be cited. The intention according to the invention is to prevent these numbers from being identical which a summation of several harmonics of the same order would induce.

Indeed, for a given sound volume of the noise components, with several noise components of the same harmonic order, the perceived sound volume is louder than with several noise components having different harmonic orders.

Thus to avoid this, it may be proposed that rotor 2 comprises a number of pairs of poles different from that of the number of blades 26 of the two axial end surfaces 81, 82 respectively. For example, the number of pairs of pole is 8, while the number of blades is 11 or 13.

The performance of the cooling of the machine and in particular of front winding head 51 is related to the flow of cooling air blown by blades 26 of the axial surface located on the front side of the machine. On the other hand, the noise generated by these flows is directly related to the air velocity. Thus, in order to minimize this noise, it may be proposed in particular that front winding head 51 has a form allowing a reduced ejection velocity of the air for a given ejection rate. Thus, while keeping a given air speed, it is possible to minimize the flow velocity of the cooling air.

For this purpose, a winding head form allowing the surface of the air flow to be increased can be envisaged for example. Indeed, for a given speed, the velocity can thus be lowered while increasing the surface of the flow.

Figure 4:
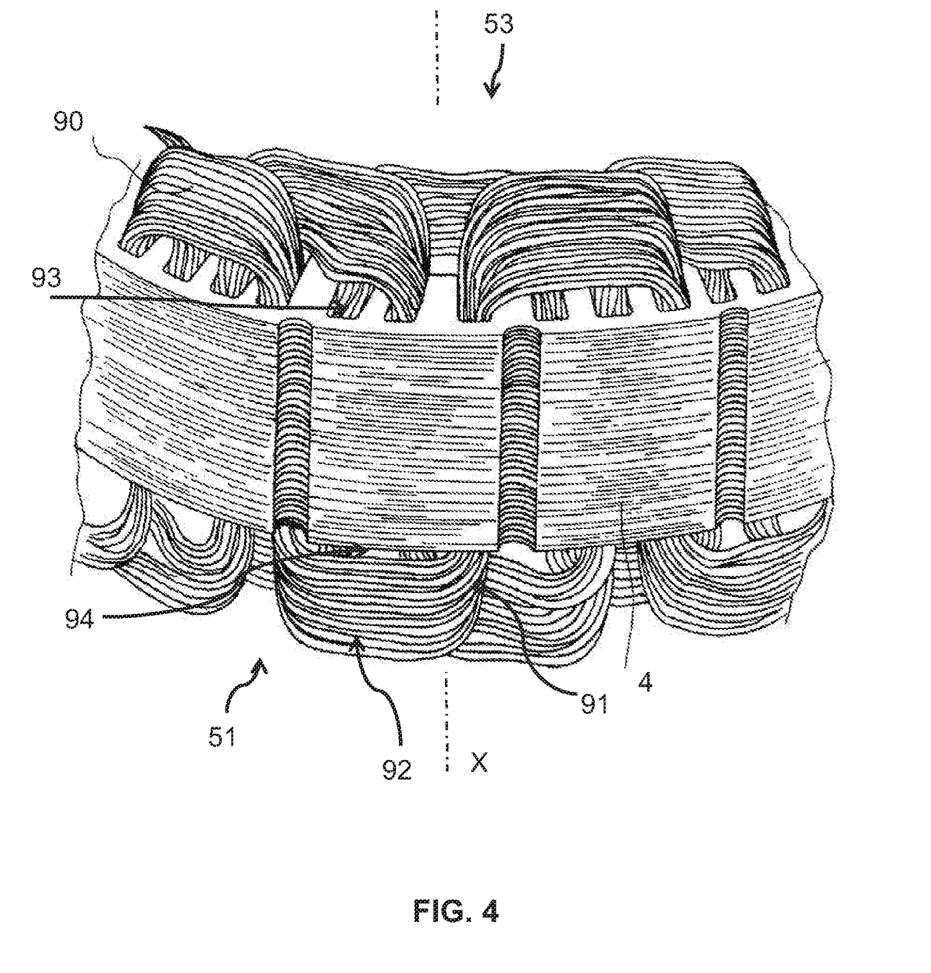
FIG. 4 is a perspective view of a winding head for a rotating electric machine according to the invention.

FIG. 4 illustrates a detail of stator 50 according to the invention. It comprises a stator body 4, a winding 5 installed in slots 93, the winding forming front winding head 51 and rear winding head 53.

It is envisaged that the winding heads comprise wires 90 provided with two axial portions 91 extending along axis X and a transverse portion 92 extending in a plane perpendicular to axis X, front winding head 51 forming spacings 94 located between the transverse portions and stator body 4.

These spacings 94 allow passage of the air. Thus a surface of the flow which increases and therefore a reduction in the flow velocity and in the noise are obtained for a given speed.

In the embodiment illustrated on FIG. 4, the winding heads comprise groups of wires which extend between two slots. The wires of these groups of wires comprise two axial portions 91 and a transverse portion 92. Thus these groups of wires substantially exhibit the shape of a rectangle.

It may be proposed according to another embodiment that the form of each of these groups is triangular or conical, which makes it possible to substantially increase the surface of the centrifugal flow of the flows in order to limit their velocity. However, in this case a compromise must be respected, because the function of sound screen of the winding head can be limited by these forms. For this purpose, it may be proposed that winding head 51 comprises a head having a conical form, the head being the part of the winding head axially furthest from stator body 4. The head comprises the axial end of front winding head 51. Thus a good compromise between reduction in the velocity and conservation of the screen function is achieved.

Figure 5:
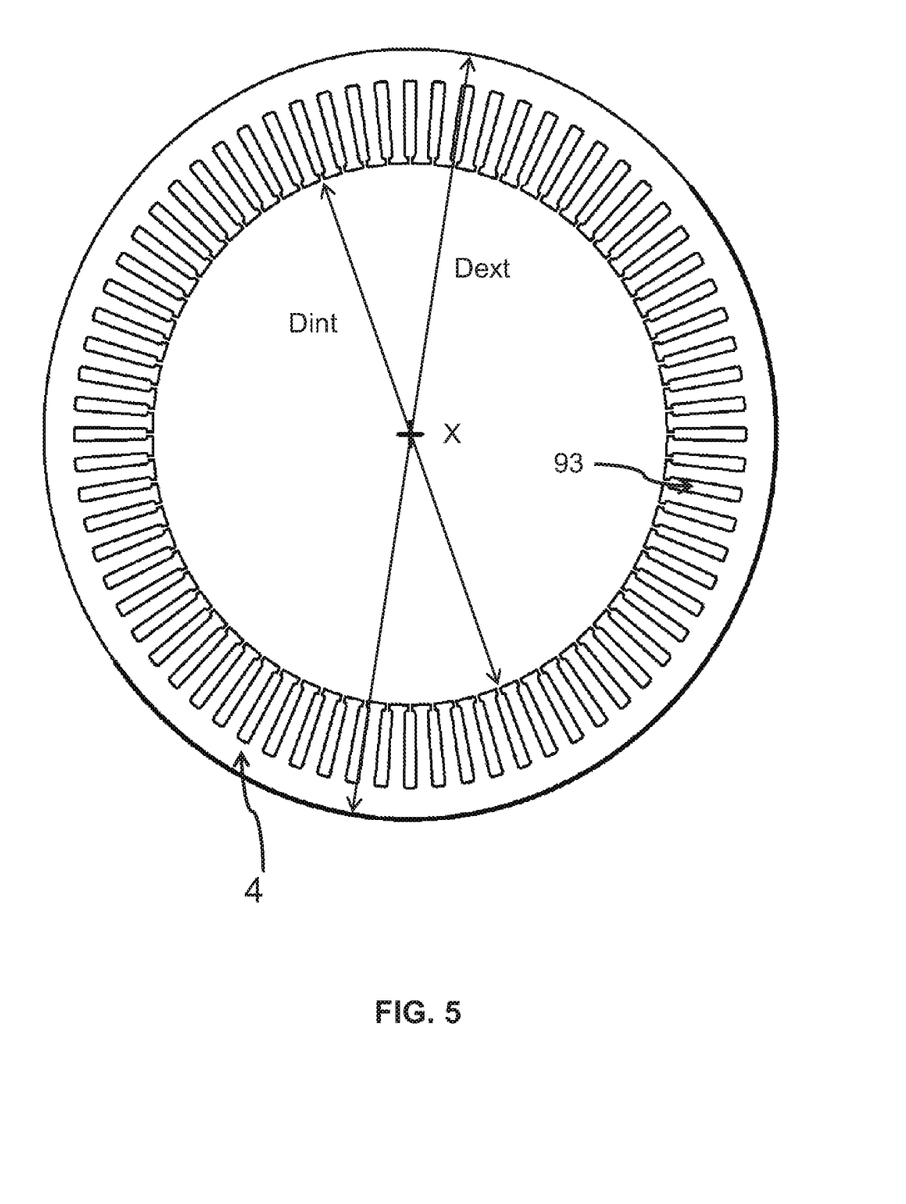
FIG. 5 illustrates a stator body for the rotating electric machine according to the invention.

FIG. 5 illustrates stator 50 according to an embodiment.

This stator comprises stator body 4 provided with slots 93 with tooth roots. It is delineated by an internal diameter Dint and an external diameter Dext. According to the embodiment it comprises 72 slots, Dint=96 mm and Dext=126 mm. Other numbers of slots could be envisaged, 36, 48, 60, 84, 96 for example.

Thus, when defining a R2 ratio of the external diameter to the internal diameter, R2=126/96=1.3125 is obtained.

The noise emitted by a rotating electric machine comprises many components each with a particular harmonic order. Every one of these components has a sound level dependant on the geometry of the elements of the rotor and/or stator. In particular, the noise comprises an even-order harmonic component 12 which is related to the number of claws of the rotor and the number of winding heads of the stator. The noise also comprises an odd-order harmonic component 11 which is related to the number of fan blades of the rotor. The noise has a sound level which is the sum of the sound levels of all these components.

Figure 6:
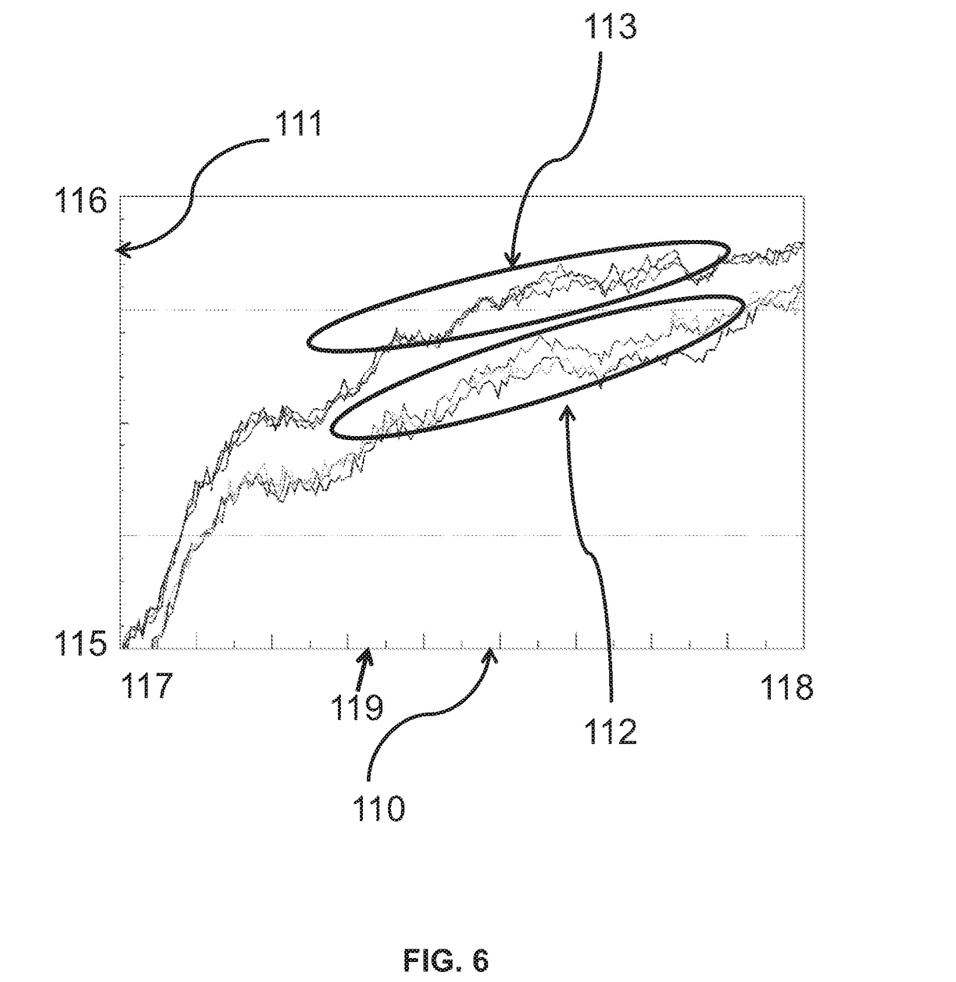
FIG. 6 illustrates curves of a sound level of the noise according to the number of revolutions and type of machine.

So as to evaluate the advantage offered by the invention, it is expedient to compare one of the sound levels of the noise emitted by the machine according to the invention as a function of a number of revolutions of the rotor with a sound level corresponding to the noise emitted by a machine of the prior art. For this purpose, FIG. 6 shows two groups of curves 112 and 113. Group 112 illustrates a sound level of the rotating electric machine as illustrated on FIG. 1 while group 113 illustrates a sound level of the rotating electric machine as illustrated on FIG. 3.

Axis 110 illustrates the number of revolutions in rpm. This axis 110 comprises a lower limit 117 with a value of 9000 rpm for example and an upper limit 118 with a value of 18000 rpm for example. Axis 110 is graduated in 1000's and comprises secondary graduations of 500. Axis 110 moreover comprises an intermediate value 119 of 13204 rpm.

Axis 111 illustrates the value of the sound level expressed in dBW (A). This axis 111 comprises a lower limit 115 with a value of 85 dBW (A) for example and an upper limit 116 with a value of 105 dBW (A) for example. Axis 111 is graduated in 1's.

As known by the person skilled in the art, a value expressed in dBW (A) indicates an evaluation in decibels of a sound level with weighting A of the standard IEC 61672-1. This weighting is designed to take account of the average sensitivity of the ear of a person whose hearing is considered normal for each waveband. This weighting thus enables a sound level perceived by a user of the automotive vehicle to be illustrated.

For example, the sound level of the groups of curves 112 and 113 illustrated on FIG. 6 is that of the odd-order component 11, also known as harmonic order 11.

Thus the group of curves 113 comprises 3 curves each representing the sound level of the harmonic order 11 according to the number of revolutions of the rotor for an electric machine known by the person skilled in the art. Group of curves 112 comprises 3 curves representing the sound level of the harmonic order 11 according to the number of revolutions of the rotor for an electric machine in which front winding head 51 masks the blades of the fans of axial end surface 81 located on the front side of the machine by means of a shift of winding 5 towards the front of the machine, so that height Ha is greater by 1 mm than height Hb.

Thus a reduction in the sound level of about 3 dB for the harmonic 11 is noted for similar machines, while the overall sound level (not illustrated) is reduced by about 1 dB.

Figure 7:
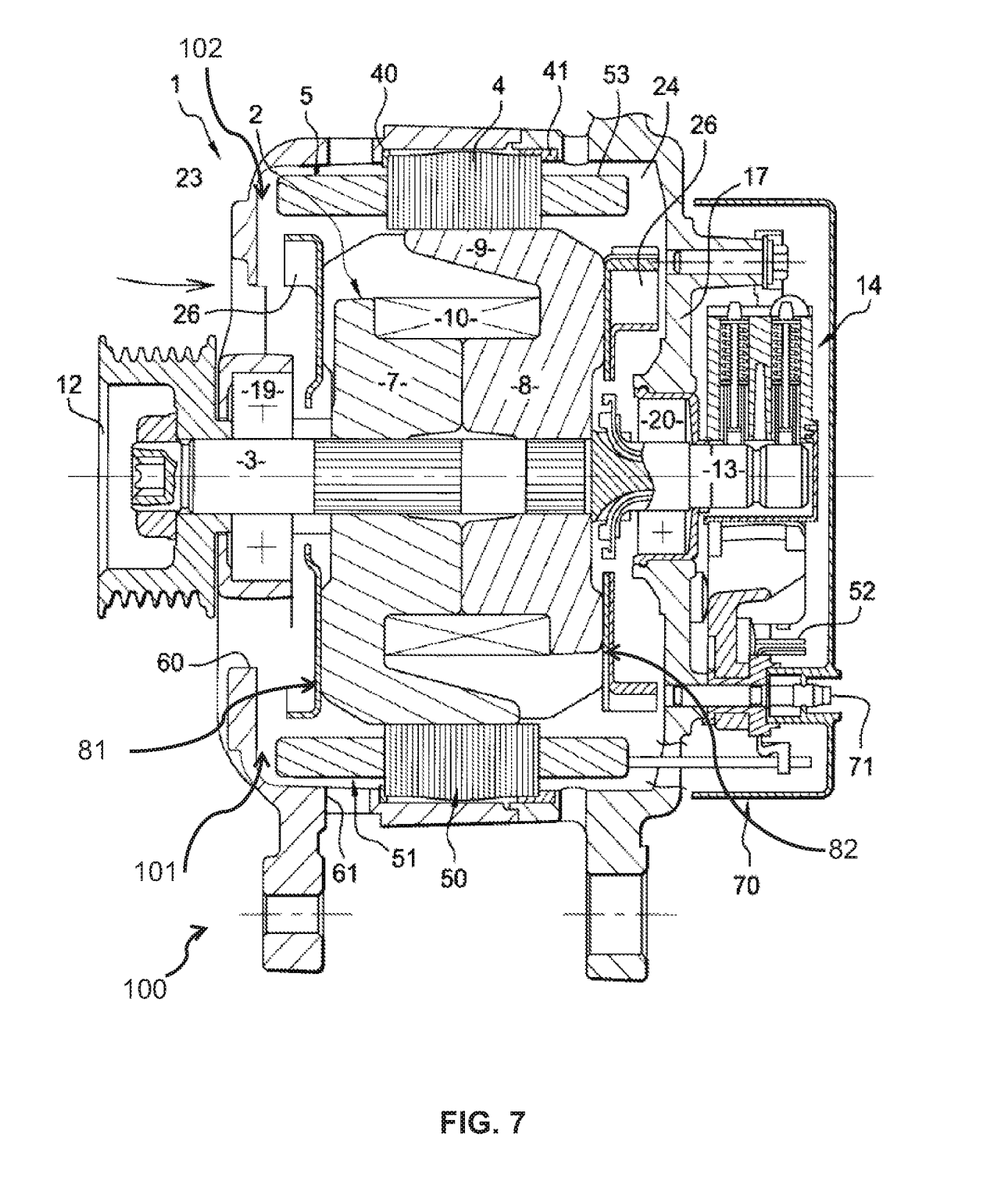
FIG. 7 illustrates a cross-section of a rotating electric machine in the form of an alternator according to a second embodiment of the invention.

FIG. 7 illustrates a machine according to a second embodiment of the invention. This machine comprises two flow windows 101 and 102 of the cooling air which are defined between casing 1 and front winding head 51, the thickness of casing 1 being reduced to the level of these windows 101, 102 to allow an increase of said window. Thus, for a given air speed, the flow velocity can be reduced and therefore the noise can be abated.

For example, as illustrated on FIG. 7, the thickness of the front flange can be reduced by 1 mm.

Figure 8:
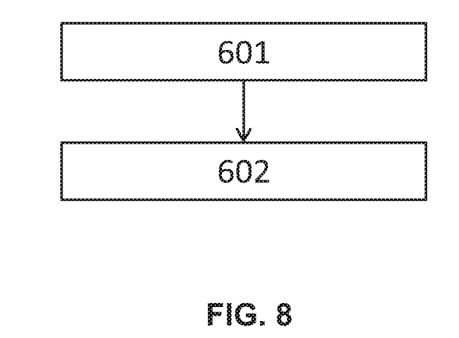
FIG. 8 illustrates a method according to the invention.

FIG. 8 illustrates a method for constructing a rotating electric machine 1 as illustrated on FIGS. 3 and 7.

With reference to FIG. 3, this electric machine is provided with an axis X and comprises a front part 16 and a rear part 17 relative to axis X.

The machine moreover comprises a rotor 2 of axis X comprising two axial end surfaces 81, 82 which are provided with fan blades 26 allowing a flow of cooling air for example by centrifugal ejection. These two axial surfaces 81, 82 are located on the side of the front part and on the side of rear part 17 of machine 1 respectively.

The machine moreover comprises a stator 50 which includes a stator body 4 having slots 93 and surrounds said rotor 2.

The method illustrated on FIG. 8 comprises:
- a winding stage 601 of copper wires in said slots 93 so as to form a front winding head 51 which extends from an axial end of stator body 4 towards front part 16 of machine 1 and a rear winding head 53 which extends from another axial end of stator body 4 towards rear part 17 of machine 1,
- an offsetting stage 602 along an axial direction of the winding relative to stator body 4, so that axial front winding head 51 completely masks blades 26 of axial surface 81 located on the front side of machine 1, along a direction perpendicular to axis X.

The invention is applicable to rotors having blades 26 higher, or equal, at the level of axial surface 81 located on the front side of the machine, than at the level of axial surface 82 located on the rear side of the machine. The invention is also applicable to rotors having blades 26 higher at the level of the axial surface 82 located on the side rear machine than at the level of axial surface 81 located on the front side of the machine. The invention is applicable to all types of fan blades, whether they are centrifugal or mixed.

The invention claimed is:

1. A rotating electric machine (100) provided with an axis X, the electric machine comprising:
    a front part (16) and a rear part (17) relative to the axis X;
    a rotor (2) coaxial with the axis X, the rotor (2) comprising two axial end surfaces (81, 82) provided with fan blades (26) allowing a flow of cooling air, the two axial surfaces (81, 82) being located on a side of the front part (16) and on a side of the rear part (17) of the electric machine respectively;
    a stator (50) comprising a stator body (4) having slots (93) and surrounding the rotor (2), the stator (50) comprising a winding (5) installed in the slots (93) forming a front winding head (51) which extends from an axial end of the stator body (4) towards the front part (16) of the electric machine and a rear winding head (53) which extends from another axial end of the stator body (4) towards the rear part (17) of the electric machine (100);
    a casing (1) in which the rotor and the stator are placed, the casing including the front part (16) and the rear part (17);
    wherein the front winding head (51) completely masks the fan blades (26) of the axial surface (81) located on the front side of the electric machine along a direction perpendicular to the axis X, and
    wherein the fan blades (26) of the axial surface (82) located on the rear side of the machine axially overlap the rear winding head (53).

2. The electric machine (100) according to claim 1, wherein a level along the axis X of the front winding head (51) is higher or equal to a level along the axis X of the fan blades (26) adjacent to the front side of the machine.

3. The electric machine (100) according to claim 2, wherein the front and rear winding heads comprise wires (90) provided with two axial portions (91) extending along the axis X and transverse portions (92) extending in a plane perpendicular to the axis X, wherein the front winding head forms spacings (94) located between the transverse portions (92) and the stator body (4), and wherein the spacings (94) allow passage of the cooling air.

4. The electric machine according to claim 2, wherein the front winding head (51) has a form allowing a reduced flow velocity of the cooling air for a given flow rate.

5. The electric machine (100) according to claim 1, wherein the front and rear winding heads comprise wires (90) provided with two axial portions (91) extending along the axis X and transverse portions (92) extending in a plane perpendicular to the axis X, wherein the front winding head forms spacings (94) located between the transverse portions (92) and the stator body (4), and wherein the spacings (94) allow passage of cooling air.

6. The electric machine according to claim 5, wherein the front winding head (51) has a form allowing a reduced flow velocity of the cooling air for a given flow rate.

7. The electric machine according to claim 1, wherein the front winding head (51) has a form allowing a reduced flow velocity of the cooling air for a given flow rate.

8. The electric machine according to claim 7, wherein the winding head (51) comprises a head having a conical form.

9. The electric machine (100) according to claim 7, wherein the front and rear winding heads comprise wires (90) provided with two axial portions (91) extending along the axis X and transverse portions (92) extending in a plane perpendicular to the axis X, wherein the front winding head forms spacings (94) located between the transverse portions (92) and the stator body (4), and wherein the spacings (94) allow passage of the cooling air.

10. The electric machine according to claim 1, comprising a flow window (101, 102) of cooling air defined between the casing (1) and the front winding head (51), and wherein a thickness of the casing is reduced to a level of the window (101, 102) to allow an increase of the window (101, 102).

11. The electric machine according to claim 1, wherein a R1 ratio defined as a division of a difference between a height of the front winding head (Ha) and a height of the rear winding head (Hb) by a height of the stator body (4) ranges between 1 and 5%.

12. The electric machine according to claim 1, wherein a R2 ratio of an external diameter (Dext) to an internal diameter (Dint) ranges between 1.30 and 1.32.

13. The electric machine according to claim 1, wherein the rotor (2) comprises a number of pairs of poles different from a number of the fan blades (26) of each of the two axial end surfaces (81, 82).

14. The electric machine according to claim 1, wherein the front winding head (51) has a form allowing a reduced flow velocity of the cooling air for a given flow rate.

15. The electric machine (100) according to claim 1, wherein the cooling air enters the casing (1) through openings (60) provided only in the front part (16).

16. The electric machine (100) according to claim 15, wherein the cooling air enters the casing (1) coaxially to the axis X.

17. Method A method for constructing a rotating electric machine (100) provided with an axis X, the electric machine (100) comprising:
a front part (16) and a rear part (17) relative to the axis X;
a rotor (2) coaxial with the axis X, the rotor (2) comprising two axial end surfaces (81, 82) provided with fan blades (26) allowing a flow of cooling air, the two axial surfaces (81, 82) being located on a side of the front part and on a side of the rear part (17) of the electric machine (100) respectively;
a stator (50) comprising a stator body (4) having slots (93) and surrounding the rotor (2),
the method comprising:
a winding stage (601) of copper wires in the slots (93) so as to form a front winding head (51) which extends from an axial end of the stator body (4) towards the front part (16) of the electric machine (100) and a rear winding head (53) which extends from another axial end of the stator body (4) towards the rear part (17) of the electric machine (100); and
wherein, after the winding stage, the method moreover comprises
an offsetting stage (602) along an axial direction relative to the stator body (4) following the winding stage, so that the axial front winding head (51) completely masks the fan blades (26) of the axial surface (81) located on the front side of the machine (100) along a direction perpendicular to the axis X and the fan blades (26) of the axial surface (82) located on the rear side of the machine axially overlap the rear winding head (53).

18. The electric machine (100) according to claim 17, wherein the front and rear winding heads comprise wires (90) provided with two axial portions (91) extending along the axis X and transverse portions (92) extending in a plane perpendicular to the axis X, wherein the front winding head forms spacings (94) located between the transverse portions (92) and the stator body (4), and wherein the spacings (94) allow passage of the cooling air.

19. The electric machine (100) according to claim 17, wherein the cooling air enters the casing (1) through openings (60) provided only in the front part (16).

20. The electric machine (100) according to claim 19, wherein the cooling air enters the casing (1) coaxially to the axis X.

* * * * *